United States Patent
Jehan et al.

(10) Patent No.: US 10,291,880 B2
(45) Date of Patent: *May 14, 2019

(54) DEVICES, METHODS AND COMPUTER PROGRAM PRODUCTS FOR PLAYBACK OF DIGITAL MEDIA OBJECTS USING A SINGLE CONTROL INPUT

(71) Applicant: SPOTIFY AB, Stockholm (SE)

(72) Inventors: Tristan Jehan, Brooklyn, NY (US); Miguel Pereira Durão Luís, Gothenburg (SE); Babar Zafar, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,591

(22) Filed: Oct. 30, 2017

(65) Prior Publication Data

US 2018/0054592 A1    Feb. 22, 2018

Related U.S. Application Data

(63) Continuation of application No. 15/639,186, filed on Jun. 30, 2017, now Pat. No. 9,843,764, which is a
(Continued)

(51) Int. Cl.
*G06F 17/30* (2006.01)
*G11B 27/00* (2006.01)
(Continued)

(52) U.S. Cl.
CPC ............. *H04N 5/915* (2013.01); *G06F 16/64* (2019.01); *G06F 16/683* (2019.01); *G11B 27/005* (2013.01); *G11B 27/28* (2013.01)

(58) Field of Classification Search
CPC ......... G06F 17/30743; G06F 17/30775; G11B 27/005; G11B 27/28; H04N 5/915
See application file for complete search history.

(56) References Cited

U.S. PATENT DOCUMENTS

| | | |
|---|---|---|
| 5,616,876 A | 4/1997 | Cluts |
| 5,754,728 A | 5/1998 | Nakajima |
| (Continued) | | |

FOREIGN PATENT DOCUMENTS

| | | |
|---|---|---|
| WO | 2012064587 A2 | 5/2012 |
| WO | 2014066390 A2 | 5/2014 |

OTHER PUBLICATIONS

Comm. pursuant to Article 94(3) EPC issued in European Appl'n No. 16 203 853.3, dated Apr. 13, 2018.
(Continued)

*Primary Examiner* — Huy T Nguyen
(74) *Attorney, Agent, or Firm* — Merchant & Gould P.C.

(57) ABSTRACT

A component for controlling playback of digital media objects using a single control input receives, from a server, a plurality of feature vectors, each feature vector representing one of a plurality of media objects, and receives one or more skip requests from the single control input. In response to a first skip request, the component selects a feature vector from among the plurality of feature vectors and instructs a media object playback device to playback a media object represented by the selected feature vector. In response to a second or successive skip request, the component selects another feature vector from among the plurality of feature vectors that is a distance away from the previously selected feature vector and instructs the media object playback device to playback another media object represented by the selected other feature vector.

20 Claims, 16 Drawing Sheets

Related U.S. Application Data continuation of application No. 15/353,311, filed on Nov. 16, 2016, now Pat. No. 9,729,816, which is a continuation of application No. 15/185,258, filed on Jun. 17, 2016, now Pat. No. 9,531,989.

(51) Int. Cl.
| | | |
|---|---|---|
| *G11B 27/28* | (2006.01) | |
| *H04N 5/915* | (2006.01) | |
| *G06F 16/64* | (2019.01) | |
| *G06F 16/683* | (2019.01) | |

(56) References Cited

U.S. PATENT DOCUMENTS

| | | |
|---|---|---|
| 8,543,529 B2 | 9/2013 | Brodsky |
| 8,688,615 B2 | 4/2014 | Brodsky |
| 9,531,989 B1 | 12/2016 | Jehan et al. |
| 9,729,816 B1 * | 8/2017 | Jehan .............. G11B 27/28 |
| 9,843,764 B1 * | 12/2017 | Jehan .............. G11B 27/28 |
| 2008/0168022 A1 | 7/2008 | Benyamin |
| 2009/0171715 A1 | 7/2009 | Conley et al. |
| 2015/0039644 A1 | 2/2015 | Trivedi |

OTHER PUBLICATIONS

Int'l Search Report and the Written Opinion issued in connection with Int'l Appln. No. PCT/US2016/062272 dated Feb. 7, 2017.
Yajie Hu, "A Model-Based Music Recommendation System for Individual Users and Implicit user Groups", Open Access Dissertations, Retrieved from the Internet: URL:http://scholarlyrepository.miami.edu/cgi/viewcontent.cgi?article-=22098&context=oadissertations, pp. 1-103 (2014).

\* cited by examiner

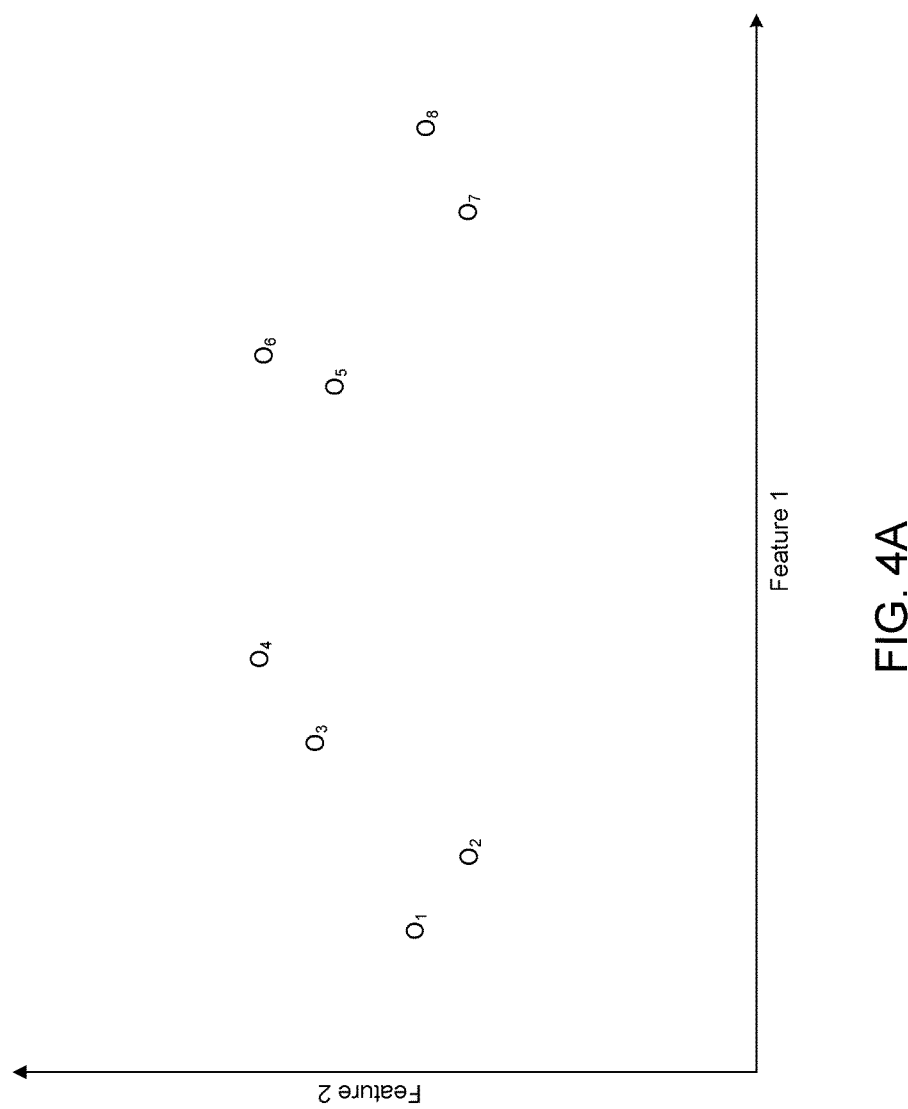

| Song ID | Feature 1 | Feature 2 | Genre | Subgenre |
|---|---|---|---|---|
| Song 1 | 3.1256 | 1.9929 | Rock | Metal |
| Song 2 | 2.9876 | 2.9924 | Rock | Metal |
| Song 3 | 1.7129 | 6.8521 | Rock | Punk |
| Song 4 | 2.6320 | 2.0445 | Rock | Punk |
| Song 5 | 4.1110 | 3.1189 | Electronic | House |
| Song 6 | 3.9472 | 1.2234 | Electronic | House |
| Song 7 | 1.9122 | 2.9916 | Electronic | Techno |
| Song 8 | 3.5548 | 3.1015 | Electronic | Techno |
| ... | ... | ... | ... | ... |

FIG. 5

DEVICES, METHODS AND COMPUTER PROGRAM PRODUCTS FOR PLAYBACK OF DIGITAL MEDIA OBJECTS USING A SINGLE CONTROL INPUT

This application is a continuation of U.S. patent application Ser. No. 15/639,186, filed Jun. 30, 2017, which is a continuation of U.S. patent application Ser. No. 15/353,311 filed Nov. 16, 2016, which is a continuation of application Ser. No. 15/185,258, filed Jun. 17, 2016, now U.S. Pat. No. 9,531,989, the disclosures of which are hereby incorporated by reference.

BACKGROUND

Field

This disclosure relates generally to digital media players, and more particularly to devices, methods, and computer program products for controlling playback of digital media objects.

Related Art

Digital media players, especially dedicated digital media player devices such as Apple Inc.'s iPod™, have been popularized in recent years as consumers largely transition from the use of analog media formats, such as cassette tapes and records, to digital media formats (i.e. digital media objects) such as audio and video files, and the like. These dedicated digital media players can store digital media objects locally on a hard drive or flash memory and have inputs and a display that allow a user to navigate (i.e. browse) through a collection of digital media objects that are stored on the device. Navigation typically requires receiving a set of inputs from a user. Digital media objects can be selected, for example, by artist name, album, or user-defined playlists. The "click wheel", popularized by Apple Inc.'s iPod™ line of digital media player products, is among the most well-known inputs for navigating through digital media objects stored locally on a digital media player.

FIG. 1 is an example of a prior art digital media player 100 having such a click wheel. The digital media player 100 provides hardware that allows a user to browse through and select from digital media objects stored locally on the digital media player 100. Such media objects can be stored, for example, on a local hard drive or flash memory (not shown). Digital media player 100 also includes a display 110 and a combination of touch technology and traditional button inputs, including a center button 120 and a click wheel 130. The click wheel 130 uses capacitive sensing to detect the movement of a user's fingers in either a clockwise or counter-clockwise direction along the surface of the click wheel 130, which serves as an input for navigating through various menus presented on the display 110 or for adjusting playback volume. A menu button 142 is also provided, as well as traditional button controls commonly seen in analog media playing devices such as a skip button 144, a back button 146 and a play/pause button 148. While the digital media player 100 is easy to use when navigating through a limited set of media objects stored locally on the device, it may be inadequate for navigating through large catalog of media content, for example, as might be hosted on a remote server.

More recently, media distribution services such as media streaming services have allowed consumers unlimited access to large catalogs of digital media content. Consumers can now use devices to connect to remote media distribution servers from which they can download or stream media content on demand from catalogs containing millions of digital media objects. While consumers are no longer limited to the small set of media objects stored locally on their devices, navigating through these vast catalogs of millions of digital media objects requires considerably more complex user interfaces, for example, that integrate search, recommendation and discovery features. Thus, media distribution services typically require the use of desktop, mobile or web applications running on general purpose computing devices such as personal computers, tablets or smartphones or on touchscreen-based dedicated media player hardware such as Apple Inc.'s iPod Touch™.

When consuming media content, locating a particular media object from a media collection using existing technology, particularly using general purpose computing devices, can be difficult and time consuming and, indeed, cumbersome to some users. In turn, this may be frustrating to some users, particularly during times when the user cannot devote much of his or her attention to making the selection. There exists a technical challenge in simplifying interfaces and more so in simplifying interfaces for navigating large catalogs of digital media content.

SUMMARY

The example embodiments described herein provide a technical solution for playback of media objects from a large catalog of digital media content using a single control input.

By virtue of the examples described herein, it is possible to provide devices for use with media distribution services that reduce the number of complex navigation controls and control steps. Another advantage of the examples described herein is that they render optional a display screen, thus reducing the overall complexity of the devices as well as lowering power consumption.

The technology disclosed herein concerns a component for controlling playback of digital media objects using a single control input that receives, from a server, a plurality of feature vectors, each feature vector representing one of a plurality of media objects, and receives one or more skip requests from the single control input. In response to a first skip request, the component selects a feature vector from among the plurality of feature vectors and instructs a media object playback device to playback a media object represented by the selected feature vector. In response to a successive skip request, the component selects another feature vector from among the plurality of feature vectors that is a spacial distance, (e.g., a cosine distance) away from the previously selected feature vector and instructs the media object playback device to playback another media object represented by the selected other feature vector. Some of the example embodiments described below are implemented using cosine distance functions. However, it should be understood that alternative distance functions or comparison calculations may be used instead of cosine distance or cosine similarity, such as, for example, other dot product or angle measurement calculations.

In one example aspect, the component calculates a skip duration as the length of time between the successive skip request and the preceding skip request and sets the (e.g., cosine) distance used to select the other feature vector based on the calculated skip duration.

In another example aspect, the component calculates two or more skip durations, each skip duration equal to a length of time between two successive skip requests, compares the calculated two or more skip durations, and sets the cosine distance used to select the other feature vector based on the comparison of the calculated two or more skip durations.

In some embodiments, for example, the component may set the distance used to select the other feature vector to a value greater than a previous distance when a most recent calculated skip duration is less than a previous calculated skip duration and set the distance used to select the other feature vector to a value less than a previous distance when the most recent calculated skip duration is greater than a previous calculated skip duration.

Further examples of the component cluster the plurality of feature vectors, calculate a skip duration as the length of time between the successive skip request and a preceding skip request, and select the other feature vector from either the same cluster as the previously selected feature vector or from a different cluster than the previously selected feature vector based on the calculated skip duration.

Alternatively, other examples of the component cluster the plurality of feature vectors, calculate two or more skip durations, each skip duration equal to a length of time between two successive skip requests, compare the calculated two or more skip durations, and select the other feature vector from either the same cluster as the previously selected feature vector or from a different cluster than the previously selected feature vector based on the comparison of the calculated two or more skip durations.

This brief summary has been provided so that the nature of this disclosure may be understood quickly. A more complete understanding can be obtained by reference to the following detailed description and to the attached drawings.

BRIEF DESCRIPTION OF THE DRAWINGS

The features and advantages of the example embodiments of the invention presented herein will become more apparent from the detailed description set forth below when taken in conjunction with the following drawings.

FIG. 4A is a view for explaining how several media objects are mapped based on one or more features.

FIG. 5 depicts an example set of feature vectors in accordance with the mapping and clustering of media objects shown in FIGS. 4A and 4B.

DETAILED DESCRIPTION

The example embodiments described herein are directed to systems, methods and computer products for playback of media objects using a single control input, which are now described in conjunction with a media control device. This description is not intended to limit the application to the example embodiments presented herein. In fact, after reading the following description, it will be apparent to one skilled in the relevant art(s) how to implement the following example embodiments in alternative embodiments (e.g., in devices other than digital media players such as wearable devices or speaker systems).

Figure 1:
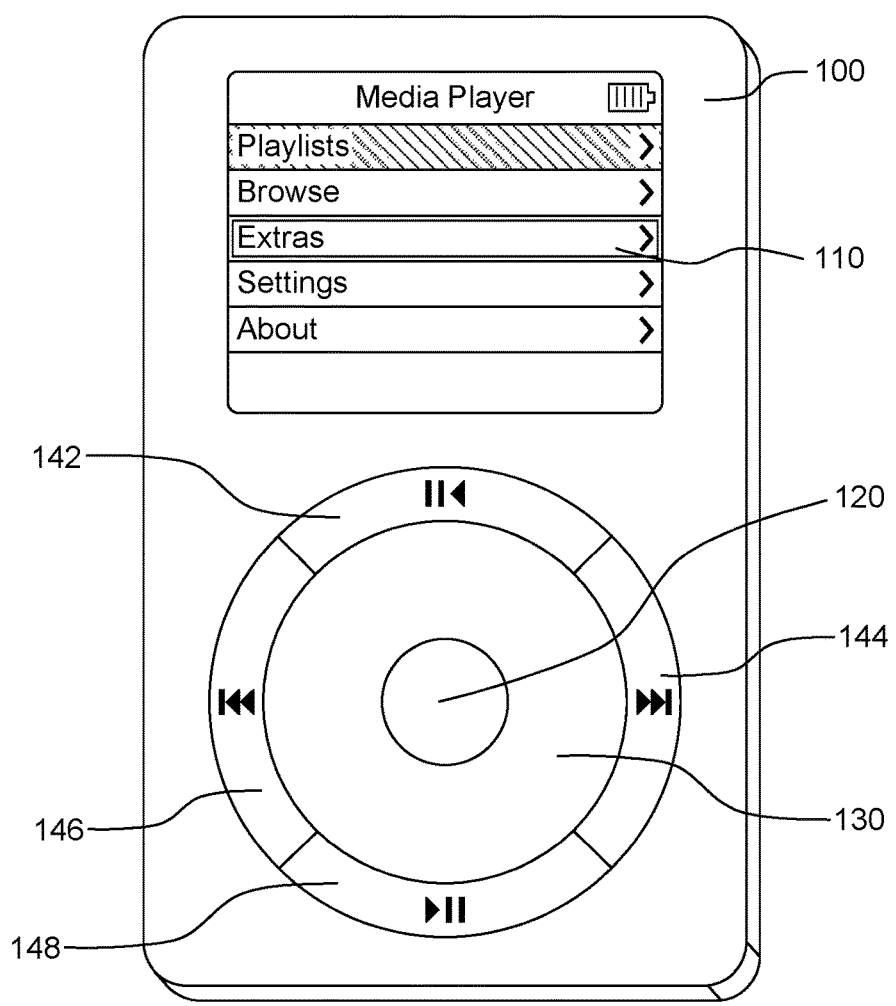
FIG. 1 is an example of a prior art digital media player.
Figure 2:
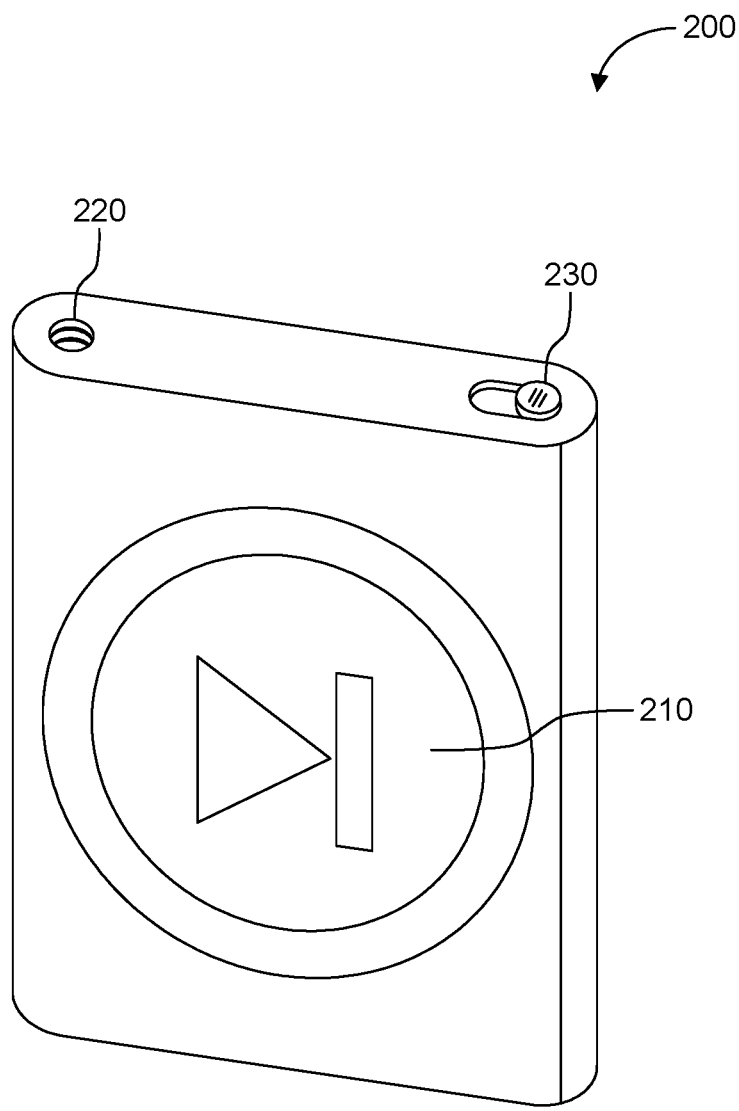
FIG. 2 depicts a media control device with a single control input according to an example embodiment.

FIG. 2 depicts a media control device 200 according to an example embodiment. Media control device 200 includes an input interface, which in the embodiment depicted in FIG. 2 is in the form of a button 210. In this embodiment, media control device 200 also includes a headphone jack 220 and a power switch 230.

Media control device 200 receives a skip request each time the button 210 is pressed by a user. In alternative examples, media control device 200 may receive a skip request based on an audio input, such as a voice command detected by a microphone, or based on an input received from a keyboard, touchscreen display, pointing device, motion sensor or the like.

As explained in more detail below, media control device 200 can browse through large catalogs of digital media content in a much more simplified manner than existing media playback devices and applications. Moreover, it can do so in an intelligent manner that takes into account both the history of a user's listening or viewing preferences on a media distribution service and current preferences of a user during a listening or viewing session. As explained in more detail below, the simplification comes by way of a combination of a single control input (or other input mechanism, e.g., a voice command or a predetermined hand gesture) and various rules for selecting media objects based on preferences or profiles of a user.

In the example of FIG. 2, the media control device 200 has an integrated media playback component, e.g., a controlling component and a playback component are both within the same housing, either on the same electronic circuit or separate circuit boards that are electrically or communicatively coupled). The controlling component selects media objects to be played. The playback component plays the audio of a selected media object.

In an alternative embodiment, the media control device 200 is communicatively coupled with an external media playback device or component and includes data and/or control lines or channels that communicate playback instructions to an external media playback device.

In another embodiment, the media control device 200 is configured to browse through a limited number of media objects stored locally on the media control device 200. These media objects may be collected or purchased by the user and loaded onto the media control device 200.

In yet another example embodiment, the media control device 200 is configured to browse through a limited number of media objects stored on an external media playback device.

In some examples, the media control device 200 is configured to browse through an entire digital music catalog stored remotely, for example, as accessed through a remote media distribution server.

In another example, the media control device 200 is configured to browse through a limited subset of the digital music catalog that is stored remotely and accessed through a media distribution server.

In still another example, the media control device 200 is configured to browse through a subset of a digital music catalog that has been downloaded from a remote media distribution server and cached locally on either the media control device 200 or a separate media playback device.

In general terms, the examples described herein involve selecting a set of media objects (either stored locally or remotely), mapping the media objects spatially in some manner based on various features of the media objects, optionally clustering the mapping of the media objects into useful groups, and then establishing rules for selecting between the mapped and clustered media objects one after another with each press of the button 210. Processing of these steps can be performed by the media control device 200, on an external media playback device, or on a remote server such as a media distribution server. Various implementations of these generalized steps will be discussed more fully below.

Figure 3:
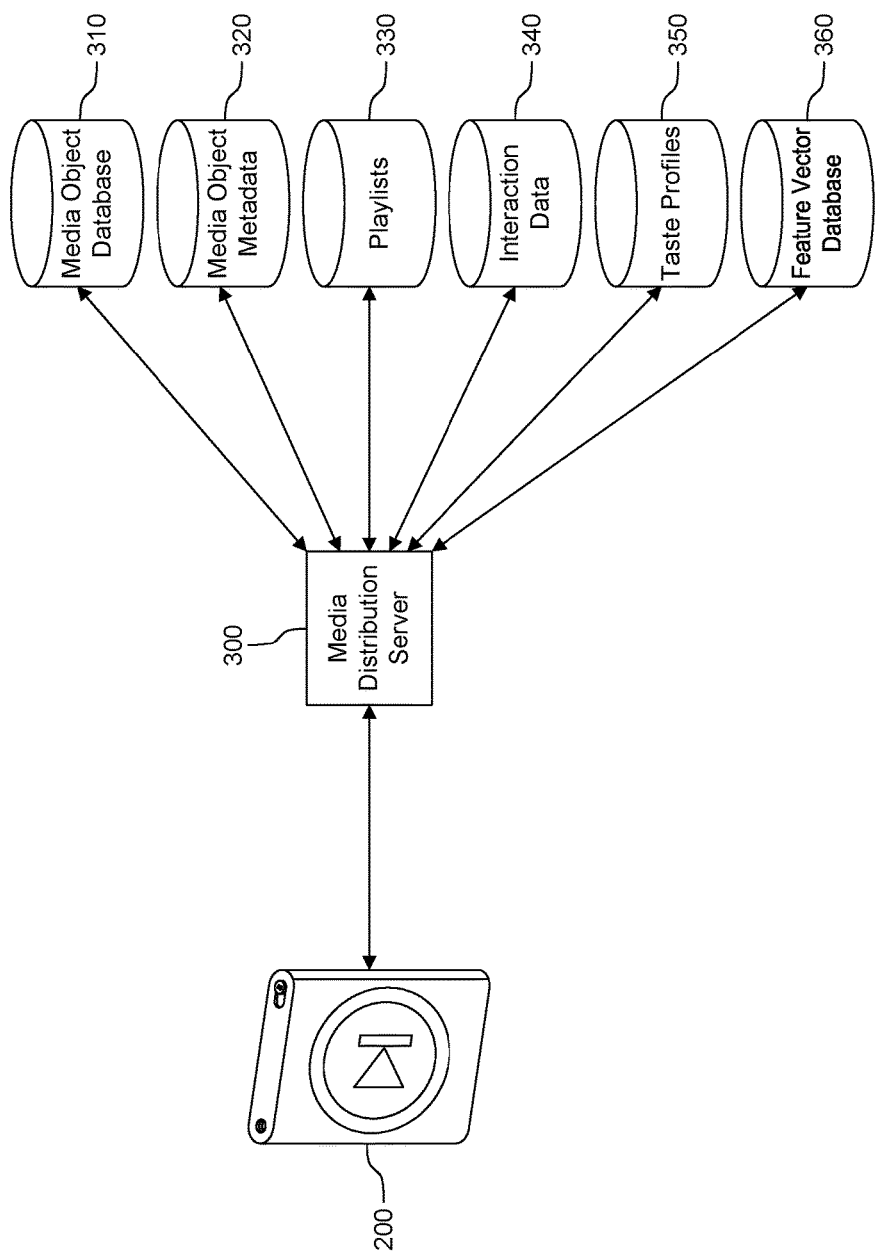
FIG. 3 is an architectural overview of an environment for media object playback using a single control input according to an example embodiment.

FIG. 3 is an architectural overview of an environment for media object playback using a single control input according to the example embodiments provided herein.

Media distribution server 300 is configured to distribute digital media content to client device 200 for playback, the client device 200 being communicatively coupled to media distribution server 300 over a network such as a local area network, wide area network, mobile network, and the like. Media distribution server 300 delivers digital media objects such as audio, images, videos, audiobooks, podcasts, movies and TV shows.

As shown in FIG. 3, media object database 310 is communicatively coupled to media distribution server 300. Media objects are stored in the form of media files in a media object database 310. Media distribution server 300 distributes media to client device 200 as downloadable objects (i.e. media files), live streaming objects (e.g., radio stations or video channels), on-demand streaming media, and so forth.

Media distribution server 300 can also be configured to deliver media-related applications and services to client device 200. Media distribution server 300 is able to store and retrieve data from several additional data sources such as a media object metadata database 320, a playlists database 330, an interaction data storage 340, a taste profiles database 350, and a feature vector database 360.

Client device 200 is computer hardware and/or software that can access and interact with the media content and services made available by media distribution server 300. Client device 200 accesses the media stored in the media object database 310 and the data stored in the additional data sources 320, 330, 340, 350 and 360 through the media distribution server 300. While client device 200 can be a general purpose personal computer, tablet or smartphone running a desktop, mobile or web application that connects with media distribution server 300, in the examples described herein, client device 200 is a dedicated media control device having at least one control input such as a physical button input, touchscreen input or voice command input (e.g., FIG. 2, 200 and FIG. 3, 200). The media control device 200 is discussed in more detail below with respect to FIGS. 6 and 7A-7E.

Media object metadata 320 stores metadata associated with the media objects stored in media object database 310 such as song or video titles, artist names, song or video durations, and associated album titles. Metadata may also include tags or labels for identifying and organizing the media objects, such as genre labels.

Playlist database 330 stores playlists. Playlists are data structures that contain a finite list of media objects and associated metadata (e.g., a list of songs or videos or a queue of songs or videos). These playlists can be user generated at client device 200, automatically generated, or manually created by an editorial staff.

Interaction data 340 includes data about interactions of client device 200 with the music distribution service (e.g., songs or videos streamed or downloaded, playlists created, applications executed, etc.). These interactions can be performed, for example, using client device 200 and may be collected into interaction histories (e.g. media sessions, or viewing and listening histories). These interaction histories contain a record of media objects in media object database 310 and corresponding interaction information such as how the media objects were interacted with and when they were accessed. A taste profile of a user can in turn be constructed from the records stored in one or more interaction histories.

Taste profiles database 350 stores taste profiles. A taste profile is a named collection of media content items. A taste profile can be associated with a user and used to maintain an in-depth understanding of the music activity and preference of that user, enabling personalized recommendations, taste profiling and a wide range of social music applications.

In one example, a taste profile is a representation of media activity, and includes a wide range of information such as artist plays, song or video plays, skips, ratings by the user, date of listening or viewing by the user, playlists, play counts, start/stop/skip data for portions of a song or video, contents of collections, user rankings, preferences, or mentions, etc. Thus, the taste profile data includes, in addition to an artist name or a media object title, one or more of the following: length of listening or viewing activity for a media object, length of listening activity for an album or collection, and user actions during song or video play, such as fast forwarding, skipping, stopping or pausing, or other media plays, such as websites visited, book titles, movies watched, playing activity during a movie or other presentations, ratings, or terms corresponding to the media, such as "comedy", "sexy", etc.

A taste profile can represent a single user or multiple users. Conversely, a single user or entity can have multiple taste profiles. For example, one taste profile could be generated in connection with a user's total interaction history, whereas another separate taste profile could be generated for the same user based only on the selection of media objects for a playlist.

In addition, priority or preference values for a particular media object or artist can be stored in the taste profile and can be weighted more heavily if, for example, an artists or media object is listened to or viewed more frequently, or if a user has identified favorite artists or media objects.

While the disclosure refers mainly to using musical and video data such as artist name or song or video title, for purposes of clarity, it should be understood that the disclosure is not limited thereto. In particular, another media preference (e.g., book or game preference) can be used instead of, or in combination with, musical or video data. For example, number of views or reads, mentions from social media networks, or user settings or favorites lists can be obtained by crawling or mining this information from the web or other user data to determine preferences related to types of content other than music or videos, for example, book or game titles. Thus, according to the invention, the data set and corresponding terms and weights can be one of a musical data set, a book data set, a movie data set, a game data set and the like, or some combination thereof. Various applications can then access a taste profile to generate media content recommendations or to provide query results.

Feature vector database 360 stores feature vectors. Generally, a feature vector is a multi-dimensional data structure for representing one or more features of a media object from among media object database 310. Each dimension of a feature vector quantifies an individual feature of the respective media object. This could, for example, include any kind of observable feature, such as an attribute of the raw audio or video data of the media object. For example, for a song file, an observable feature may be a feature of the raw audio of the song, such as the song's tempo, valence, energy, or the like. A feature vector could also include a feature assigned to the media object, such as a genre tag. A feature vector could also include one or more latent features, such as features that are inferred through a mathematical model, machine-learning algorithm or collaborative filtering technique. Feature vectors are described more fully below with respect to FIGS. 4A-4B and FIG. 5.

FIG. 4A is a view for explaining how several media objects having features are mapped in accordance with those features. As a simple example, the plot of FIG. 4A is a mapping of eight media objects ($O_1, O_2 \ldots O_8$) based on two features of the media objects, Feature 1 and Feature 2. These eight media objects can also be represented by two-dimensional feature vectors with dimensions: <Feature 1, Feature 2>, as described more fully below with respect to FIG. 5.

While the example plot provides a mapping of the media objects in a two-dimensional space (i.e., having only two features, Feature 1 and Feature 2), any number of dimensions can be used and any type of mapping can be used, by, for example, plotting or mapping the relationship of the media objects at various positions based on similarities and differences in one or more features.

In the examples described herein, a set of media objects is spatially mapped, for example, as shown in FIG. 4A, and the media control device of FIG. 2 selects one of the mapped media objects upon receiving at its control input a first skip request (e.g., when the button 210 is first pressed). Then, with each subsequent skip request, e.g., press of the button 210, the media control device will select the next mapped media object some distance away from the previously selected media object. The length of the distance and the direction in which the media control device makes a selection is dictated by rules that can be programmed to instruct the device to make intelligent selections, for example, by taking into account preferences or taste profiles of a user.

The media objects mapped as in FIG. 4A can be selected from any set of media objects. For example, the mapped media objects could include every media object from media object database 310, only a subset of media objects from media object database 310, only media objects listed in a specific playlist, only media objects found in an interaction history, or only media objects recommended based on a taste profile, or combination thereof. The mappings can represent media objects to be streamed or downloaded from media object database 310, or they can represent media objects stored or cached locally on media control device 200.

Figure 4B:
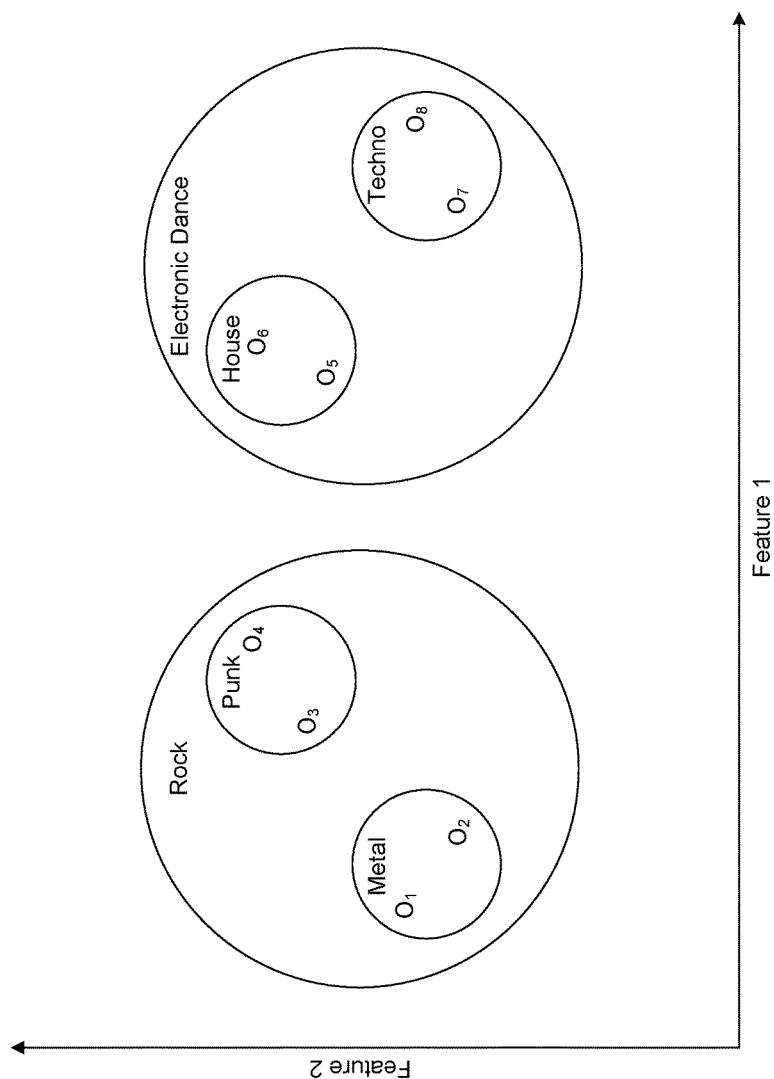
FIG. 4B is a view for explaining how the several media objects mapped in FIG. 4A are further clustered into genres and subgenres.

FIG. 4B illustrates the media objects mapped in FIG. 4A further clustered into corresponding groups, namely genre and subgenre clusters.

In FIG. 4B, the eight media objects ($O_1, O_2 \ldots O_8$) are shown as song files clustered into one of two clusters, the clusters corresponding to two different musical genres, rock and electronic dance. The media objects are then further clustered into subgenres within each genre category: metal and punk under the rock genre, and house and techno under the electronic dance genre. It should be understood that the media objects can be clustered, grouped or organized in any number of ways. They can be clustered, for example, based on raw audio or video attributes, artist names, or year of production. They may also be clustered based on user preferences as provided by one or more taste profiles or based on a listing of the media objects in one or more playlists. Clustering may be done by manually labeling the media objects or in an automated fashion using, for example, using a machine learning algorithm, indexing engine or clustering framework.

FIG. 5 depicts an example set of feature vectors in accordance with the mapping and clustering of media objects shown in FIGS. 4A and 4B.

In FIG. 5, eight feature vectors are depicted for each of the media objects ($O_1, O_2 \ldots O_8$) mapped and clustered in FIGS. 4A and 4B, the eight feature vectors being listed in a table 500. Column 510 of table 500 lists a song identification (ID) for each media object, column 520 lists values for Feature 1 for each of the media objects, column 530 lists values for Feature 2 for each of the media objects, column 540 lists genre labels for each of the media objects, and column 550 lists subgenre labels for each of the media objects. The genre and subgenre labels (540, 550) are used to cluster the media objects as shown in FIG. 4B. In alternative examples, the genre and subgenre labels can be replaced by numeric or alphanumeric representations of genre and subgenre. Several feature vectors can be combined into a single data structure or data file such as in the form of a table or map file. This data file can be downloaded and stored on media control device 200 or accessed from a remote server.

As shown in FIG. 5, feature vectors are objects storing values corresponding to various features of media objects. The measure of similarity between two or more feature vectors can be described as a cosine similarity between the feature vectors (e.g., as the cosine of the angle between them in vector space) based on the values stored in each dimension of the feature vectors. The cosine distance between two or more feature vectors is the complement of the cosine similarity in a positive vector space. Cosine similarity and cosine distance may be used to compare feature vectors of any number of dimensions, but are most useful for comparison of feature vectors in high-dimensional vector space. It should be understood that alternative distance or comparison calculations may be used instead of cosine distance or cosine similarity, such as, for example, other dot product or angle measurement calculations.

In another example embodiment, specific behaviors can be attached to multiple skip requests (e.g., double and/or triple skip requests). For example, double skip requests can cause the media playback component to automatically generate an instruction that causes a jump to (i.e., select) the next cluster and then upwards to other super clusters, and so forth. Triple skip requests, for example, can cause the media playback component to generate an "auto scan mode"

instruction that causes the media object playback device to playback samples (e.g., 30 second samples) of media items in each cluster.

Figure 6:
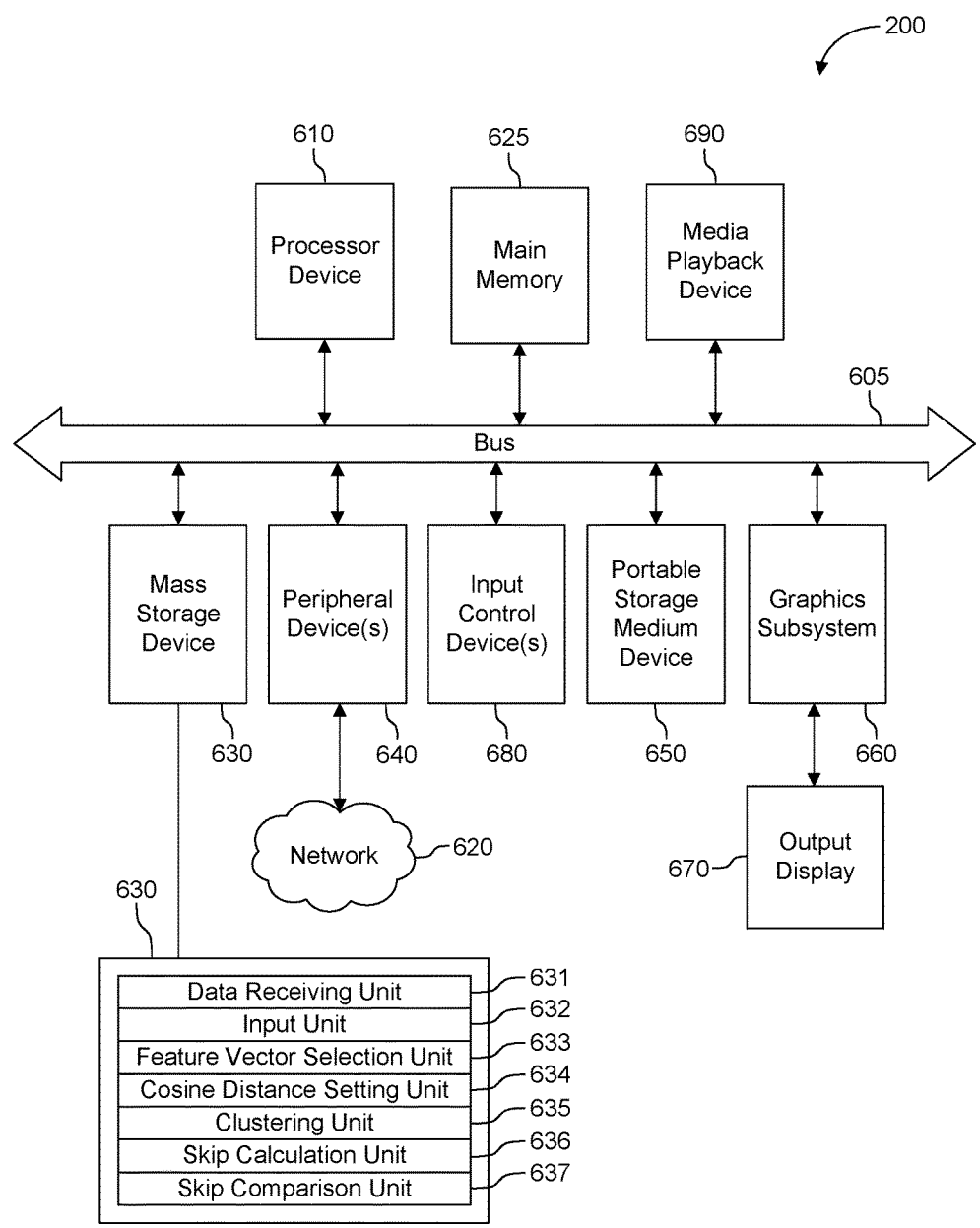
FIG. 6 is a block diagram for explaining additional details of a media control device with a single control input according to the example embodiments described herein.

FIG. 6 is a block diagram for explaining further details of the media control device (e.g., 200, FIG. 3), in accordance with some of the example embodiments described herein.

The media control device 200 includes a processor device 610, a main memory 625, and an interconnect bus 605. The processor device 610 may include without limitation a single microprocessor, or may include a plurality of microprocessors for configuring the media control device 200 as a multi-processor system. The main memory 625 stores, among other things, instructions and/or data for execution by the processor device 610. The main memory 625 may include banks of dynamic random access memory (DRAM), as well as cache memory.

The media control device 200 may further include a mass storage device 630, peripheral device(s) 640, portable non-transitory storage medium device(s) 650, input control device(s) 680, a graphics subsystem 660, and/or an output display interface 670. For explanatory purposes, all components in the media control device 200 are shown in FIG. 6 as being coupled via the bus 605. However, the client device 200 is not so limited. Elements of the media control device 200 may be coupled via one or more data transport means. For example, the processor device 610 and/or the main memory 625 may be coupled via a local microprocessor bus. The mass storage device 630, peripheral device(s) 640, portable storage medium device(s) 650, and/or graphics subsystem 660 may be coupled via one or more input/output (I/O) buses. The mass storage device 630 may be a non-volatile storage device for storing data and/or instructions for use by the processor device 610. The mass storage device 630 may be implemented, for example, with a magnetic disk drive or an optical disk drive. In a software embodiment, the mass storage device 630 is configured for loading contents of the mass storage device 630 into the main memory 625.

Mass storage device 630 additionally stores data receiving unit 631, input unit 632, feature vector selection unit 633, cosine distance setting unit 634, clustering unit 635, skip calculation unit 636, and skip comparison unit 637. Data receiving unit 631 receives, from a server, a plurality of feature vectors, each feature vector representing one of a plurality of digital media objects. Input unit 632 receives one or more skip requests, for example, from a single skip button (e.g., 210, FIG. 2). Feature vector selection unit 633 selects from among the received feature vectors individual feature vectors in accordance with the skip requests received by input unit 632 and instructs a media object playback device to playback a media object represented by the selected feature vector. Cosine distance setting unit 634 calculates skip durations as the length of time between two or more received skip requests and sets a cosine distance used by the feature vector selection 633 to select from among the feature vectors. Clustering unit 635 clusters the received feature vectors into one or more groups. Skip calculation unit 636 calculates skip durations by measuring the time between when two successive skip requests. Skip comparison unit 637 compares one or more calculated skip durations such that the feature vector selection unit 633 may select feature vectors in accordance with one or more calculated skip durations or a comparison of calculated skip durations. The functionality of each of these units is described in further detail below with respect to FIGS. 7A-7E.

The portable storage medium device 650 operates in conjunction with a nonvolatile portable storage medium, such as, for example, flash memory, to input and output data and code to and from the media control device 200. In some embodiments, the software for storing information may be stored on a portable storage medium, and may be inputted into the media control device 200 via the portable storage medium device 650. The peripheral device(s) 640 may include any type of computer support device, such as, for example, an input/output (I/O) interface configured to add additional functionality to the client device 200. For example, the peripheral device(s) 640 may include a network interface card for interfacing the media control device 200 with a network 620.

The input control device(s) 680 provide a portion of the user interface for a user of the media control device 200. The input control device(s) 680 may include a keypad and/or a cursor control device. The keypad may be configured for inputting alphanumeric characters and/or other key information. The cursor control device may include, for example, a handheld controller or mouse, a trackball, a stylus, and/or cursor direction keys. The media control device 200 may include an optional graphics subsystem 660 and output display 670 to display textual and graphical information. The output display 670 may include a display such as a CSTN (Color Super Twisted Nematic), TFT (Thin Film Transistor), TFD (Thin Film Diode), OLED (Organic Light-Emitting Diode), AMOLED display (Activematrix organic light-emitting diode), and/or liquid crystal display (LCD)-type displays. The displays can also be touchscreen displays, such as capacitive and resistive-type touchscreen displays.

The graphics subsystem 660 receives textual and graphical information, and processes the information for output to the output display 670.

Input control devices 680 can control the operation and various functions of client device 200.

Input control devices 680 can include any components, circuitry, or logic operative to drive the functionality of the media control device 200. For example, input control device(s) 680 can include one or more processors acting under the control of an application.

Also shown FIG. 6 is media playback device 690. As described above, the media control device 200 can have its own media playback component or functionality or a media playback device 690 can be integrated into the media control device 200. Alternatively, the media control device 200 can instruct a separate, but connected, media playback device 690 to play a specified media object.

While the media control device 200 is depicted in FIG. 3 as having only a single control input for playback of digital media objects, as in the button 210 of FIG. 2, any number of additional inputs or displays may be added to the media control device 200 to provide additional functionality as needed. For example, the media control device 200 may optionally include a small display for displaying the name of the currently playing media object. The media control device 200 may also include additional buttons, for example, for pausing playback, adjusting the volume of playback, or switching between various playback modes. The media control device 200 may also include a microphone or other audio recording technology to receive voice commands. Moreover, as shown in the examples of FIGS. 8A through 8D, media control device 200 may be integrated in a variety of hardware devices for example as part of a steering wheel in a vehicle, as part of a wearable device such as a watch or armband, or as part of a speaker device such as a portable Bluetooth speaker or voice command device.

FIGS. 7A-7E are flow diagrams for explaining several example processes for playback of media objects using a single control input. The processes can be performed, for example, using the media control device 200 of FIGS. 2 and 3.

Figure 7A:
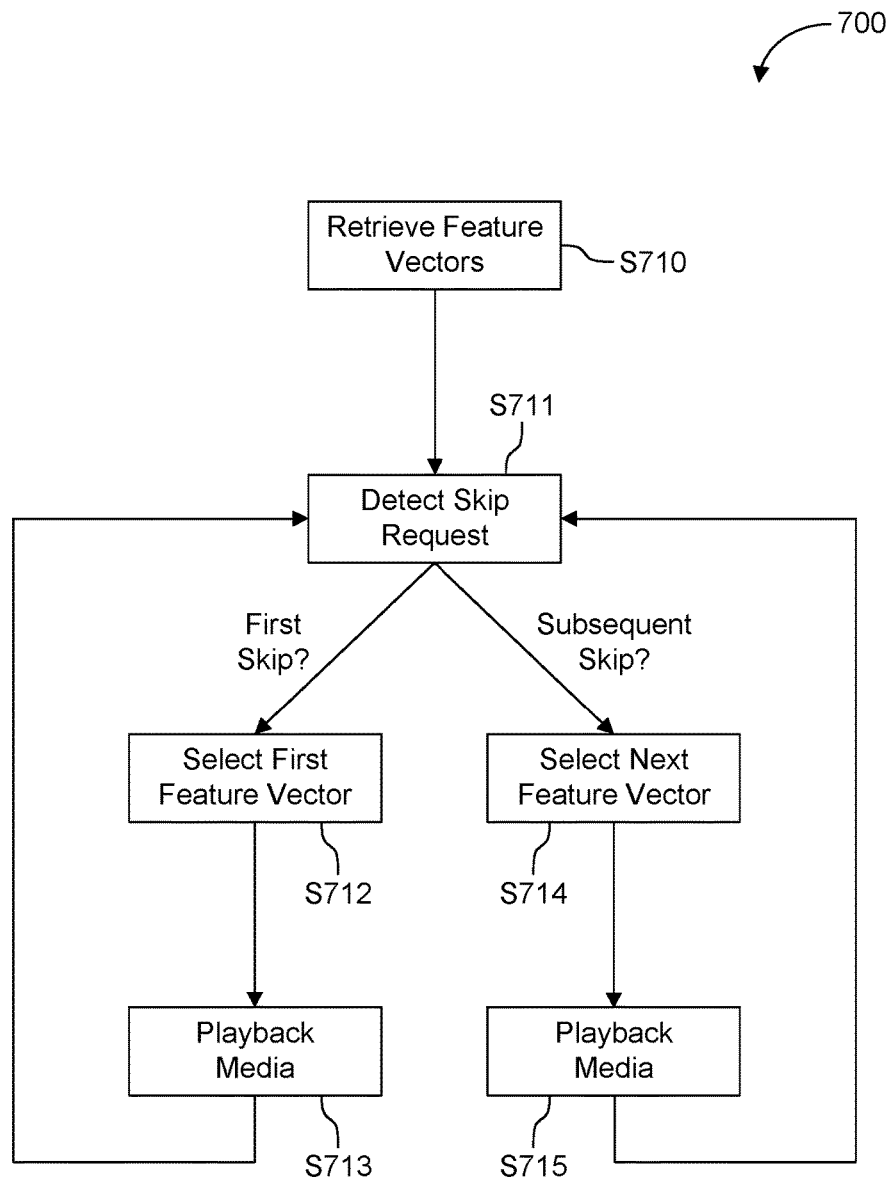
FIGS. 7A-7E are flow diagrams for explaining several example processes for playback of media objects using a single control input.

In FIG. 7A, step S710 first involves retrieving, from a server, a plurality of feature vectors, each feature vector representing one of a plurality of media objects. Step S711 involves detecting one or more skip requests.

If, in step S711, a first skip request is detected, the process proceeds to step S712, in which a first feature vector from among the plurality of feature vectors is selected and then to step S713, in which a media object playback device is instructed to playback a media object from among the plurality of media objects represented by the selected feature vector. The first selected feature vector may be selected randomly or based on any other set of programmed rules, for example, the first selected feature vector could correspond to the most recent media object added to a playlist, a most popular song of the day, a curated selection made by an editorial staff, or a recommendation based on a taste profile.

If, in step S711, a second or subsequent skip request is detected, the process proceeds to step S714, in which another feature vector from among the plurality of feature vectors is selected that is a cosine distance away from the previously selected feature vector, and then to step S715, in which the media object playback device is instructed to playback another media object from among the plurality of media objects represented by the selected other feature vector.

Figure 7B:
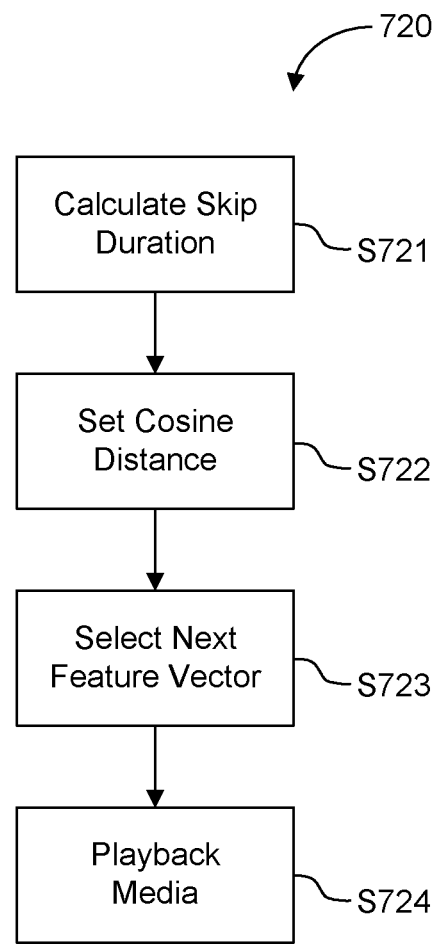

FIG. 7B explains in further detail how the cosine distance can be set and a second feature vector can be selected in response to a second skip request. In step S721, a skip duration is calculated as the length of time between the second skip request and the preceding skip request, and, in step S722, the cosine distance used to select the other feature vector is set based on the calculated skip duration. Accordingly, in step S714, another feature vector from among the plurality of feature vectors is selected that is a cosine distance away from the previously selected feature vector, and then in step S715, the media object playback device is instructed to playback another media object from among the plurality of media objects represented by the selected other feature vector.

Figure 7C:
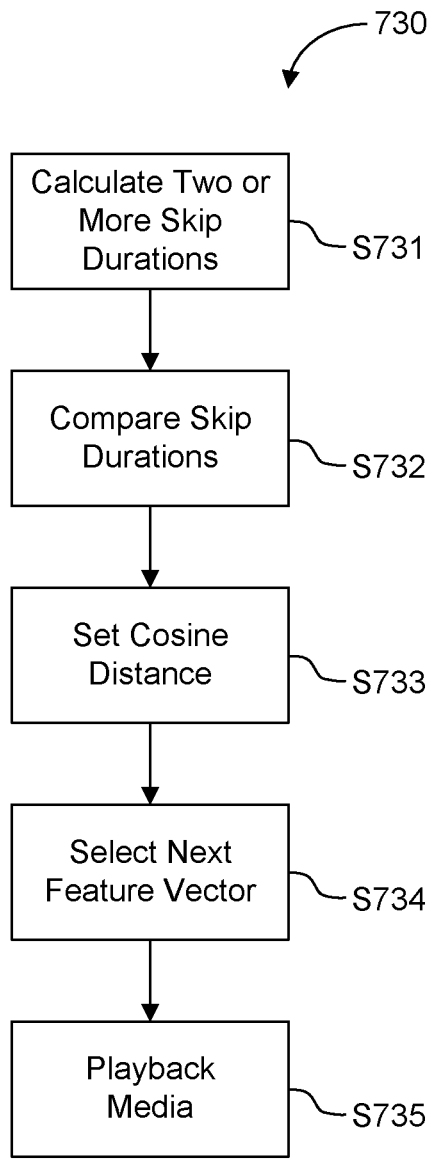

Alternatively, in the process shown in FIG. 7C, step S731 involves calculating two or more skip durations, each skip duration equal to a length of time between two successive skip requests, step S732 involves comparing the calculated two or more skip durations, and step S733 involves setting the cosine distance used to select the other feature vector based on the comparison of the calculated two or more skip durations. In step S734, another feature vector from among the plurality of feature vectors is selected that is a cosine distance away from the previously selected feature vector, and in step S735, the media object playback device is instructed to playback another media object from among the plurality of media objects represented by the selected other feature vector.

In one example embodiment of the process of FIG. 7C, the cosine distance used to select the other feature vector is set to a value greater than a previous cosine distance when a most recent calculated skip duration is less than a previous calculated skip duration, and the cosine distance used to select the other feature vector is set to a value less than a previous cosine distance when the most recent calculated skip duration is greater than a previous calculated skip duration.

Figure 7D:
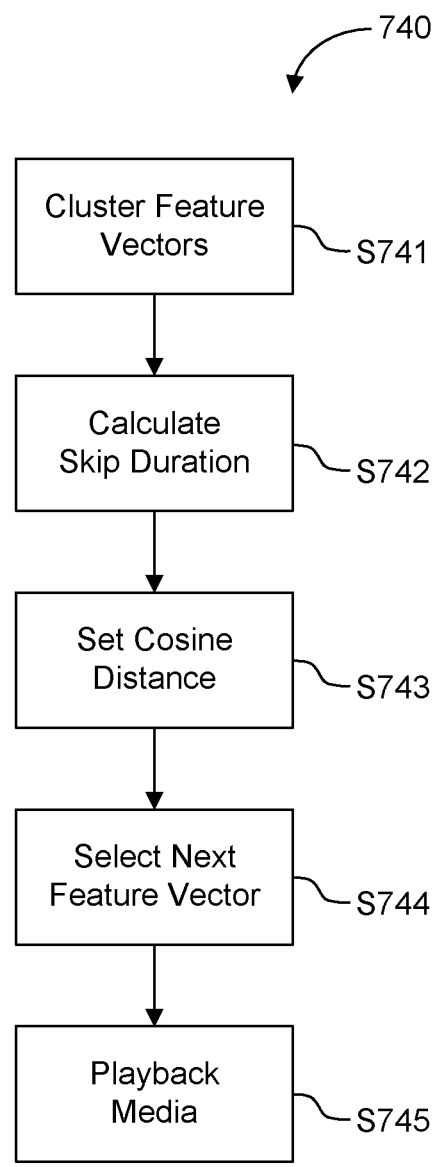
Figure 7E:
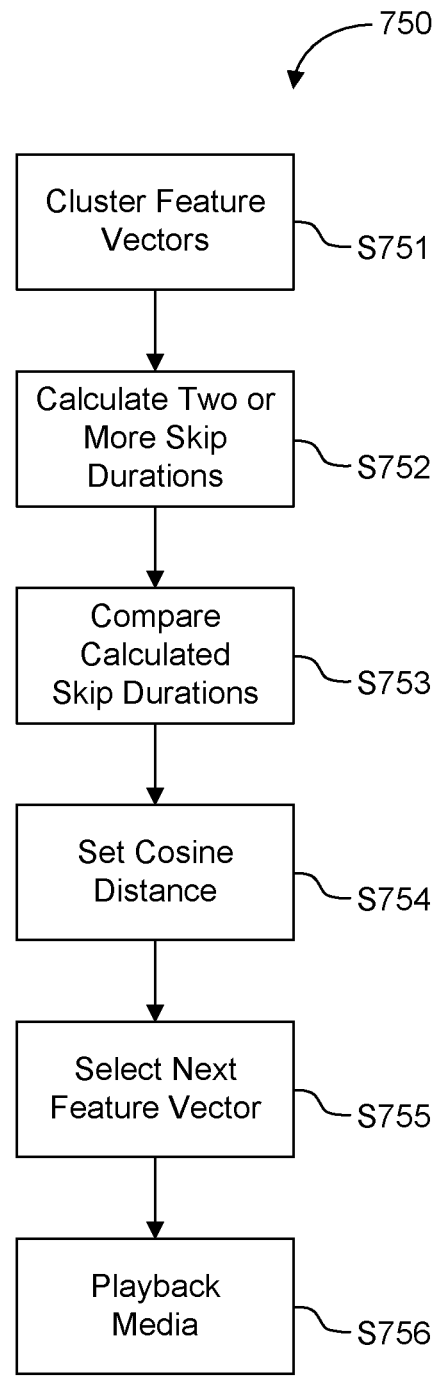

The processes of FIGS. 7D and 7E further involve steps of clustering the feature vectors. In FIG. 7D, step S741 first involves clustering the plurality of feature vectors. In step S742, a skip duration is calculated as the length of time between the successive skip request and a preceding skip request, and in step S743, the cosine distance used to select the other feature vector is set based on the calculated skip duration. In step S744, another feature vector from among the plurality of feature vectors is selected that is a cosine distance away from the previously selected feature vector and that is either the same cluster as the previously selected feature vector or from a different cluster than the previously selected feature vector based on the comparison of the calculated two or more skip durations. In step S745, the media object playback device is instructed to playback another media object from among the plurality of media objects represented by the selected other feature vector.

Alternatively, in the process shown in FIG. 7E, step S751 first involves clustering the plurality of feature vectors. In step S752, two or more skip durations are calculated, each skip duration equal to a length of time between two successive skip requests. In step S753, the calculated two or more skip durations are compared. In step S754, the cosine distance used to select the other feature vector is set based on the calculated skip duration. In step S755, another feature vector from among the plurality of feature vectors is selected that is a cosine distance away from the previously selected feature vector and that is either the same cluster as the previously selected feature vector or from a different cluster than the previously selected feature vector based on the comparison of the calculated two or more skip durations. In step S756, the media object playback device is instructed to playback another media object from among the plurality of media objects represented by the selected other feature vector.

In the examples of FIGS. 7D and 7E, the clustering step can involve clustering the plurality of feature vectors using cosine similarities between the plurality of feature vectors.

It should be understood that FIGS. 7A-7E provide merely a general framework by which countless rules can be designed for comparing skip durations and setting the cosine distance. The steps of each process may be performed in various order, for example, the clustering of feature vectors can be performed before any skip requests are detected. In addition, various rules can also be designed for determining the direction in which the media control device or component selects one mapped media object after another. For example, the media control device can be instructed to move between clusters of media objects in a certain order, for example, in order of favorite genres of a user, date of release, or audio attributes such as tempo or intensity.

Hardware that implements the devices, processes and computer programs described herein can be designed in various form factors including, but not limited to, portable media players, wearable devices, vehicle integrations and speaker systems.

Figure 8A:
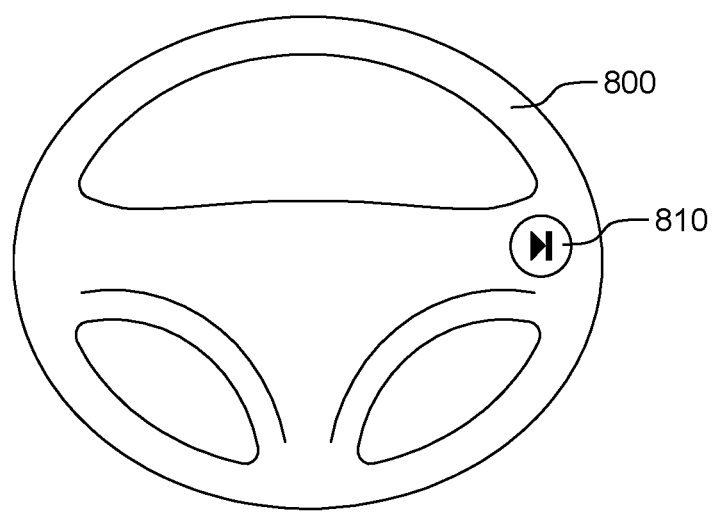
FIG. 8A depicts a component for controlling playback of media objects using a single control input as it is integrated into a vehicle steering wheel according to an example embodiment.

FIG. 8A depicts a component 810 for controlling playback of media objects using a single control input as it is integrated into a vehicle steering wheel 800. The single input interface of the component 810 can be useful for providing safer media playback controls during driving. In some examples, the component 810 may additionally or alternatively include voice recognition or recording capabilities to capture skip requests as audio input.

Figure 8B:
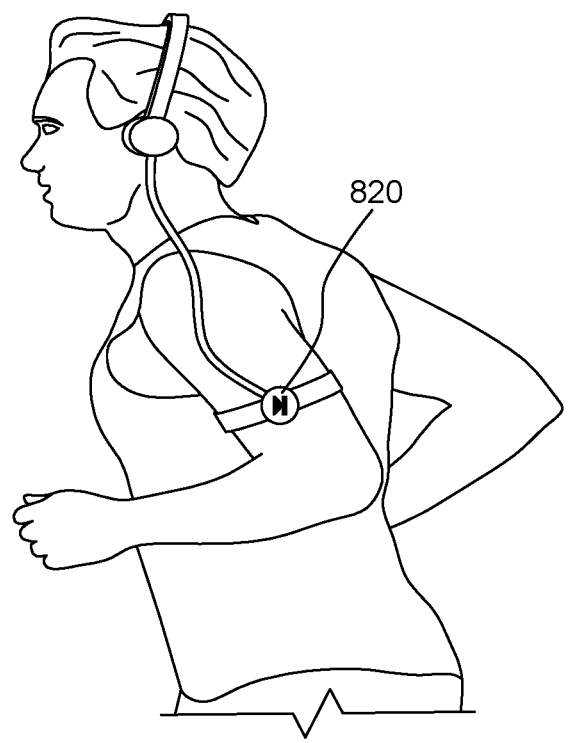
FIG. 8B depicts a component for controlling playback of media objects using a single control input as it is integrated into a wearable device according to an example embodiment.

FIG. 8B depicts a component for controlling playback of media objects using a single control input as it is integrated into a wearable device 820. The wearable device 820 of FIG. 8B provides a hardware form factor that may be particularly useful during running or exercise activities, especially as compared to larger, more cumbersome devices such as a general purpose smartphone or large touch-screen based media player device.

Figure 8C:
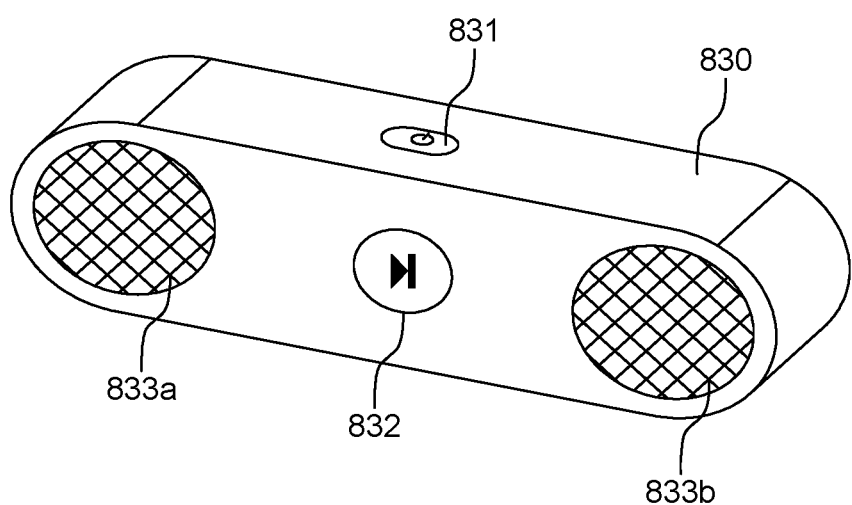
FIG. 8C depicts a component for controlling playback of media objects using a single control input as it is integrated into a wireless speaker according to an example embodiment.

FIG. 8C depicts a component for controlling playback of media objects using a single control input as it is integrated into a wireless speaker 830. In this example, wireless speaker 830 provides a power switch 831, a single control input 832 and right and left speakers 833a and 833b.

Figure 8D:
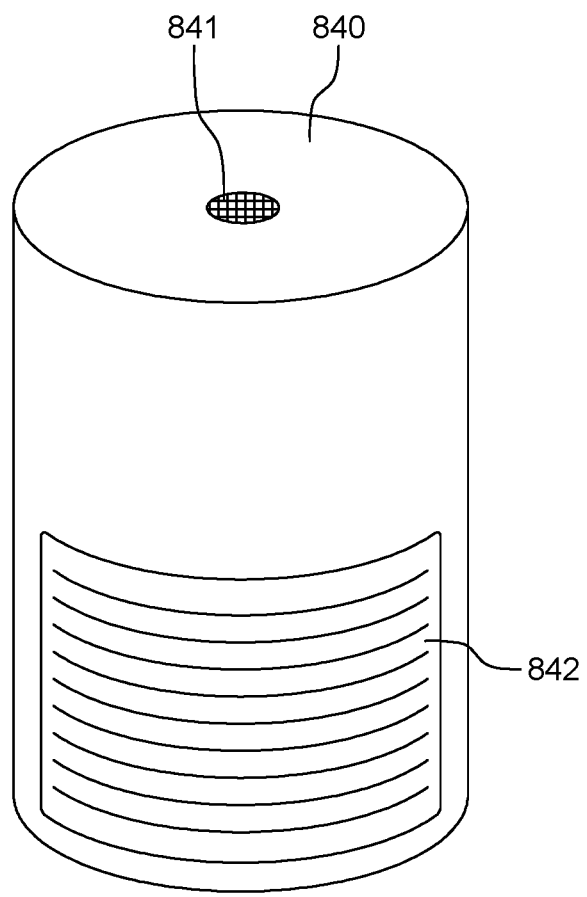
FIG. 8D depicts a component for controlling playback of media objects using a voice control input as it is integrated into a voice command device according to an example embodiment.

FIG. 8D depicts a component for controlling playback of media objects using a voice control input as it is integrated into a voice command device 840. The example voice command device 840 features no physical buttons or input display, but instead provides a microphone 841 for receiving audio input. The audio input can be in the form of a voice command which is used to effect a processing action similar to if button 210 of the embodiment discussed above with respect to FIG. 2 was pressed. Also depicted is a speaker 842 for providing audio output including media object playback. In addition to media object playback, voice command device 840 can use audio input to, for example, generate to-do lists, set alarms, provide weather or traffic information or control connected devices.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1 through 8D are presented for example purposes only. The architecture of the example embodiments presented herein is sufficiently flexible and configurable, such that it may be utilized (and navigated) in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for playback of a media object, comprising:
    a user interface operable to input skip requests; and
    a control system arranged to:
        detect skip requests input by way of the user interface,
        select feature vectors in response to detected skip requests, wherein at least some of the features vectors are selected based on time durations between detected skip requests, and
        generate at least one instruction to play back at least one media object represented by at least one selected feature vector,
        wherein at least one of the user interface or the control system is vehicular mounted.

2. The system of claim 1, wherein the user interface is mounted in a steering wheel of a vehicle.

3. The system of claim 1, wherein the control system also is arranged to calculate time durations between the corresponding detected skip requests, and set distances between the successive ones of the feature vectors based on calculated time durations.

4. The system of claim 3, wherein the distances are cosign distances and are not the same.

5. The system of claim 3, wherein the control system also is arranged to cluster the feature vectors.

6. The system of claim 5, wherein the feature vectors are clustered in different or same clusters.

7. The system of claim 1, wherein the system includes a vehicle.

8. The system of claim 7, wherein at least one of the user interface or the control system is mounted in a steering component of the vehicle.

9. The system of claim 1, wherein the at least one instruction to play back the at least one media object is provided to a media playback component that is responsive to the at least one instruction for playing back the at least one media object.

10. The system of claim 9, wherein the media playback component is external to the system.

11. The system of claim 9, wherein the system further comprises the media playback component.

12. The system according to claim 1, wherein the user interface includes at least one of an audio user interface, a tactile-input user interface, or a motion sensor user interface.

13. A method for playback of a media object, comprising:
receiving inputted skip requests;
selecting feature vectors in response to inputted skip requests, wherein at least some of the features vectors are selected in the selecting based on time durations between inputted skip requests; and
generating at least one instruction to play back at least one media object represented by at least one selected feature vector,
wherein the inputted skips requests are received by way of a vehicular mounted user interface.

14. The method of claim 13, wherein the vehicular mounted user interface is mounted in a steering wheel of a vehicle.

15. The method of claim 13, further comprising:
calculating time durations between inputted skip requests; and
setting distances between the feature vectors based on calculated time durations.

16. The method of claim 15, wherein the distances are cosign distances and are not the same.

17. The method of claim 13, further comprising clustering the feature vectors.

18. The method of claim 17, wherein the feature vectors are clustered in different or same clusters.

19. The method of claim 13, wherein receiving the skip requests includes receiving the skip requests as audio input.

20. The method of claim 13, further comprising providing the at least one instruction to play back the at least one media object to a media playback component that is responsive to the at least one instruction for playing back the at least one media object.

* * * * *